United States Patent
Chau et al.

(10) Patent No.: US 6,805,813 B1
(45) Date of Patent: Oct. 19, 2004

(54) HIGH BRIGHTNESS GREEN-EMITTING PHOSPHOR

(75) Inventors: Chung-Nin Chau, Athens, PA (US); Gregory A. Marking, Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/435,434

(22) Filed: May 9, 2003

(51) Int. Cl.[7] .................. C09K 11/78; C09K 11/63
(52) U.S. Cl. ............................................. 252/301.4 R
(58) Field of Search ................................. 252/301.4 R

(56) References Cited

FOREIGN PATENT DOCUMENTS

JP          11-071581         3/1999    ........... C09K/11/78

OTHER PUBLICATIONS

Kwon et al., *Luminescence properties of borate phosphors in the UV/VUV region*, J. Luminescence 87–89 (2000) 1039–1041.

*Primary Examiner*—C. Melissa Koslow
(74) *Attorney, Agent, or Firm*—Robert F. Clark

(57) ABSTRACT

A high brightness green-emitting phosphor is described. The phosphor has the general formula:

$$(Y_{(1-x-y-z)}Gd_xTb_yLa_z)BO_3$$

where
  $0.01 \leq x \leq 0.4$,
  $0.01 \leq y \leq 0.1$, and
  $0 < z \leq 0.2$.

The phosphor exhibits an enhanced brightness under VUV excitation which is desirable for plasma display panels.

6 Claims, 1 Drawing Sheet

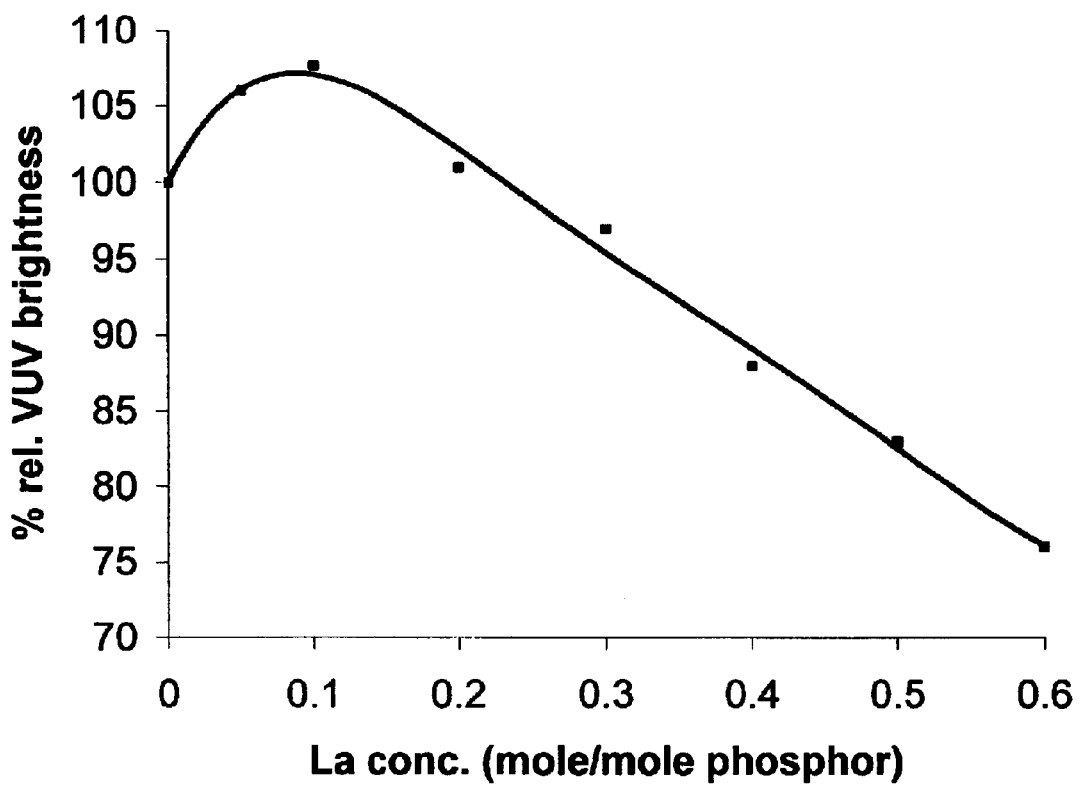

HIGH BRIGHTNESS GREEN-EMITTING PHOSPHOR

TECHNICAL FIELD

This invention is related generally to phosphors for plasma display panels. More particularly, this invention is related to green-emitting borate phosphors.

BACKGROUND OF THE INVENTION

In order to achieve full color reproduction, a plasma display panel (PDP) is composed of pixels which emit light corresponding to the three primary colors of red, green and blue. The pixels are formed from red-, green-, and blue-emitting phosphors which have been deposited in a paste or ink form on an inner wall of the device. The binder materials are then burned out at a high temperature (about 400° C.). The tri-color emission is achieved by stimulating the phosphors with vacuum ultraviolet (VUV) radiation generated by Xe-Ne gas discharges (172 nm). The luminous efficiency, color chromaticity, afterglow, and stability of the phosphors have significant roles in the PDP performance. Typical phosphors used in PDP applications include a red-emitting (Y,Gd)BO$_3$:Eu phosphor (YOB), a green-emitting Zn$_2$SiO$_4$:Mn phosphor, and a blue-emitting BaMgAl$_{10}$O$_{17}$:Eu.

The conventional green-emitting Zn$_2$SiO$_4$:Mn phosphor suffers from a long decay time and a decreasing luminous efficiency which negatively affects panel characteristics. A potentially more effective green-emitting phosphor is yttrium gadolinium terbium borate, (Y,Gd,Tb)BO$_3$. The luminescence properties of a Y$_{0.95-x}$Gd$_x$Tb$_{0.05}$BO$_3$ phosphor system in the VUV region have been described by Kwon et al. *J. Luminescence* 87–89 (2000) 1039–1041. Japanese Patent Application 11-071581 to Ohto describes a green-emitting (Y,Gd,Tb)BO$_3$ for use in plasma display panels. The (Y,Gd,Tb)BO$_3$ phosphor exhibits a higher VUV absorption at 172 nm and experiences a smaller decrease in brightness after binder burnout.

SUMMARY OF THE INVENTION

It has been discovered that substituting a small amount of lanthanum for yttrium improves the brightness of the (Y,Gd,Tb)BO$_3$ phosphor under VUV excitation. The substituted phosphor has the general formula:

$$(Y_{(1-x-y-z)}Gd_xTb_yLa_z)BO_3$$

where 0.01≦x≦0.4, 0.01≦y≦0.1, and

0<z≦0.2.

Preferably, 0.2≦x≦0.3, 0.03≦y≦0.07 and 0.05≦z≦0.15. More preferably, 0.05≦z≦0.1. The phosphor exhibits a bright green emission (CIE color coordinates; x=0.323, y=0.610) under VUV excitation. However, increasing the amount of lanthanum above the specified range causes a decrease in the VUV brightness.

BRIEF DESCRIPTION OF THE DRAWINGS

The FIGURE illustrates the change in the VUV brightness as a function of the lanthanum concentration.

DETAILED DESCRIPTION OF THE INVENTION

For a better understanding of the present invention, together with other and further objects, advantages and capabilities thereof, reference is made to the following disclosure and appended claims taken in conjunction with the above-described drawing.

The following non-limiting examples are presented.

EXAMPLES

Several samples of yttrium gadolinium terbium borate phosphors were prepared with increasing lanthanum substitutions. The phosphors have the general formula (Y$_{(1-x-y-z)}$Gd$_{0.245}$Tb$_{0.065}$La$_z$)BO$_3$. The phosphors were made from a rare earth oxide co-precipitate formed by dissolving an amount of terbium oxide in 200 ml of concentrated nitric acid, diluting with 300 ml of water, and then heating at 80° C.–90° C. while stirring until the solution became clear. An additional 200 ml of conc. HNO$_3$ was then added. Weighed amounts of yttrium oxide, gadolinium oxide and lanthanum oxide were then added slowly to a portion of the terbium-containing solution. The second solution was stirred until clear. An additional 50 ml of conc. HNO$_3$ was added if the solution did not become clear within 30 minutes. A 2-liter quantity of an aqueous oxalic acid solution (1.7 moles oxalic acid to 1 mole rare earth oxide) was then added and the pH of the second solution was adjusted to 1–2 with ammonium hydroxide (400 to 450 ml). The co-precipitate was filtered, dried and heated in an alumina crucible at 1100° C. for 8 hours to form the oxides. The borate phosphor was prepared by combining an amount of the calcined rare earth oxide co-precipitate in a 1:1 mole ratio with boric acid and firing the mixture at 1060° C. for 3 hours in a 3% hydrogen atmosphere. The quantities of Y,La,Tb and Gd in moles per mole of phosphor and the VUV brightness of these materials under 172 nm excitation is given in following table.

| Example | Y | La | Tb | Gd | % rel. VUV brightness |
|---|---|---|---|---|---|
| 1 (control) | 0.69 | 0 | 0.065 | 0.245 | 100 |
| 2 | 0.64 | 0.05 | 0.065 | 0.245 | 106 |
| 3 | 0.59 | 0.1 | 0.065 | 0.245 | 107.7 |
| 4 | 0.49 | 0.2 | 0.065 | 0.245 | 101 |
| 5 | 0.39 | 0.3 | 0.065 | 0.245 | 97 |
| 6 | 0.29 | 0.4 | 0.065 | 0.245 | 88 |
| 7 | 0.19 | 0.5 | 0.065 | 0.245 | 83 |
| 8 | 0.09 | 0.6 | 0.065 | 0.245 | 76 |

As can be seen, the lanthanum addition causes an increase in the relative VUV brightness of the phosphor up to 0.2 moles of La per mole of phosphor. At 0.3 moles of La per mole of phosphor, the VUV brightness becomes less than the VUV brightness of the control which did not contain lanthanum.

While there has been shown and described what are at the present considered the preferred embodiments of the invention, it will be obvious to those skilled in the art that various changes and modifications may be made therein without departing from the scope of the invention as defined by the appended claims.

We claim:

1. A phosphor having the general formula;

$$(Y_{(1-x-y-z)}Gd_xTb_yLa_z)BO_3$$

where 0.01≦x≦0.4, 0.01≦y≦0.1, and

0<z≦0.2.

2. The phosphor of claim 1 wherein $0.2 \leq x \leq 0.3$ and $0.03 \leq y \leq 0.07$.

3. The phosphor of claim 1 wherein $0.05 \leq z \leq 0.15$.

4. The phosphor of claim 1 wherein $0.05 \leq z \leq 0.1$.

5. The phosphor of claim 2 wherein $0.05 \leq z \leq 0.15$.

6. The phosphor of claim 2 wherein $0.05 \leq z \leq 0.1$.

* * * * *